United States Patent [19]

Burkert et al.

[11] 4,045,643

[45] Aug. 30, 1977

[54] BOLT WELDING GUN

[75] Inventors: Walter Burkert, Munich; Walter Höpfer, Otterfing; Karl Grasmugg, Munich, all of Germany

[73] Assignee: Hilti Aktiengesellschaft, Schaan, Liechtenstein

[21] Appl. No.: 655,570

[22] Filed: Feb. 5, 1976

[30] Foreign Application Priority Data

Feb. 10, 1975 Germany .............................. 2505517

[51] Int. Cl.² ............................................ B23K 11/04
[52] U.S. Cl. ......................................... 219/98; 219/99
[58] Field of Search .................................... 219/98, 99

[56] References Cited

U.S. PATENT DOCUMENTS 3,792,223  2/1974  Spisak ..................................... 219/98

Primary Examiner—E. A. Goldberg
Attorney, Agent, or Firm—Toren, McGeady and Stanger

[57] ABSTRACT

In a bolt welding gun, a tubular bolt holder is positioned on the front end of the gun body and is threadedly connected to the tubular front part of a slide-in unit. The position of the bold holder is axially displaceable relative to the front part. A nut is threaded onto the bolt holder for fixing the position of the holder with relation to the front part. In addition, a base ring is mounted on the front end of the gun body and supporting legs for the gun extend outwardly from the ring. The base ring is coaxial with the nut and has a recess into which the nut fits for preventing its rotation. A releaseable lock within the gun body is engageable with the base ring and prevents its rotation and, as a result, the ring holds the nut against axial displacement for securing the position of the bolt holder relative to the tubular front part.

11 Claims, 2 Drawing Figures

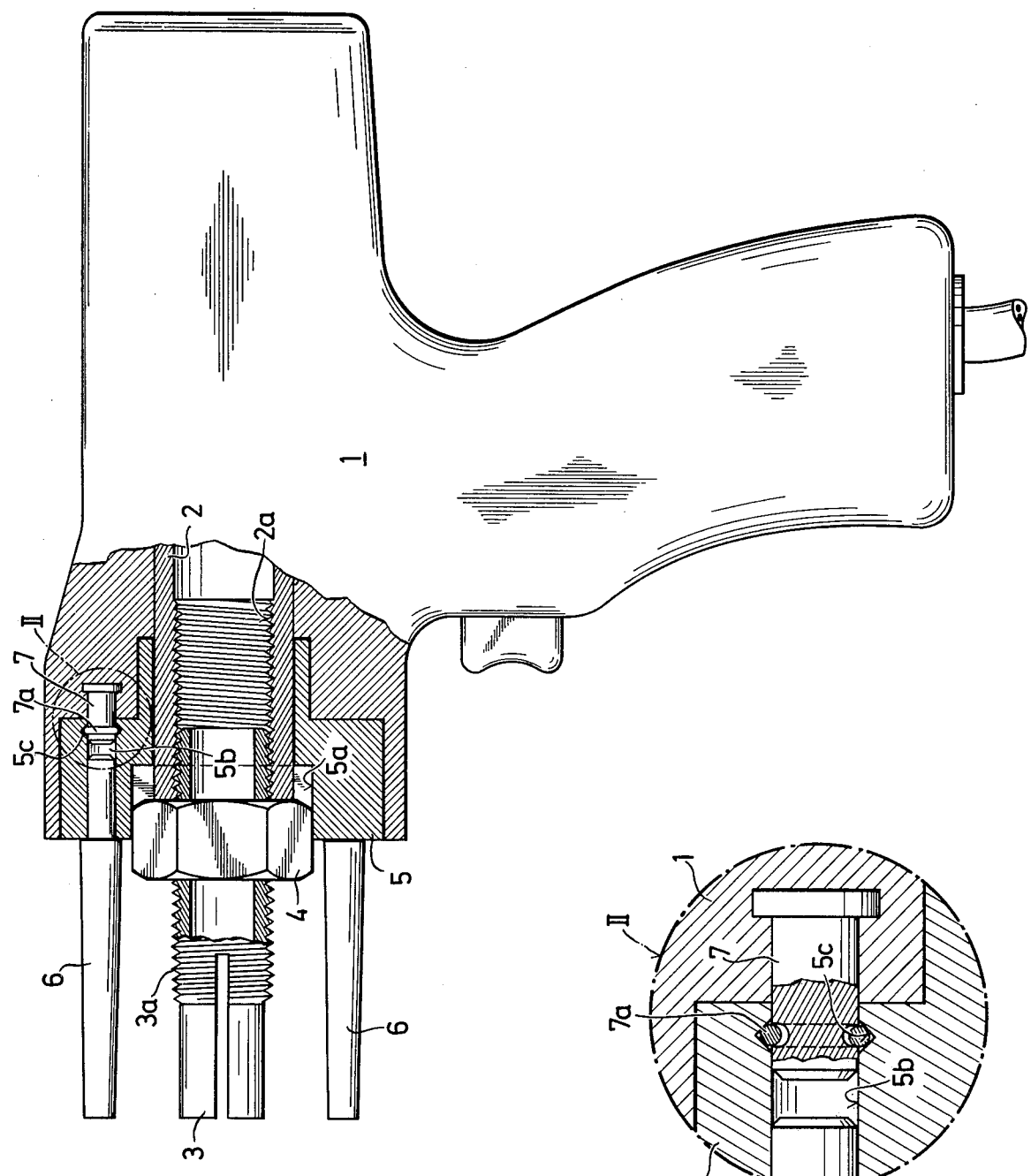

BOLT WELDING GUN

SUMMARY OF THE INVENTION

The present invention is directed to a bolt welding gun with a tubular bolt holder and supporting legs extending forwardly from the front end of the gun and, in particular, it concerns threaded connection between the bolt holder and the tubular front part of a slide-in unit within the gun body so that the bolt holder can be axially displaced relative to the tubular front part.

Bolt welding guns are used to weld elements of different shapes, for instance, threaded bolts and pins, by means of an electric arc to metallic workpieces. For commencing and forming the electric arc, the element is accelerated toward the workpiece by means of a slide-in unit over a predetermined separating distance-called an air gap- under relative high speed and current supply.

The amount of heat required for the welding operation varies in dependence on the material and the diameter of the element being welded.

Optimum welding can be achieved only if these parameters are in proper relation to the acceleration of the element being welded. Accordingly, the air gap is adjusted in known devices by displacing the bolt holder in the axial direction relative to the slide-in unit so that the extend of the air gap is increased or reduced.

In these known guns, the bolt holder is screwed into the front part of the slide-in unit and is axially adjustable within the threaded connection for increasing or reducing the air gap. However, these known threaded connections have considerable problems since they lose their self-locking characteristic, because of the rugged use of such guns. As a result, the bolt holder tends to rotate causing a change in the air gap, as well as a variation in the electrical transfer resistance, which can cause charring of the bolt holder. The inability to retain the proper air gap leads to an inadequate and undefined welding quality, as well as possible damage to the welding gun.

Therefore, the primary object of the present invention is to ensure a reliable adjustment and locking of the desired axial position of the bolt holder along with a good current transfer.

In accordance with the present invention, a locking element secures the threaded connection between the bolt holder and the front part of the slide-in unit against axial displacement.

The locking element can be a form-locking or a force-locking safety mechanism bracing the threaded connection in the radial or axial direction.

Preferably, the locking element is designed as a threaded nut. For the sake of simplicity, the bolt holder is provided with a male thread which screws into a female thread on the front part of the slide-in unit. Then the threaded nut can be screwed onto the male thread and into bearing contact with the front end face of the front part of the slide-in unit for preventing any displacement of the bolt holder once its position is set.

Basically, the threaded connection between the bolt holder and the front part of the slide-in unit can also be obtained by reverse pairing of the threads. Furthermore, the threaded nut can also effect the locking of the threaded parts over ring flanges.

Another feature of the invention is the provision of an operating control element having a common axis of rotation with the threaded nut. Preferably, the control element has a recess corresponding to the outer shape of the threaded nut so that the recess encloses the nut and forms a form-locking engagement between the two parts.

The control element has a greater diameter than the threaded nut so that the threaded nut can be operated manually by means of the control element without the use of any special tools.

It is advantageous if the control element is formed as a base ring into which the supporting legs of the welding gun are secured. Usually the supporting legs are arranged adjacent the outer edge of the base ring and extend parallel to the axis of the gun for facilitating the rotation of the control element. Accordingly, there is no problem in changing the bolt holder rapidly, since the loosening of the threaded nut and the removal of the bolt holder from the front part of the slide-in unit can be effected without any great effort.

To prevent accidental rotation of the control element, locking means are provided to hold it in position against rotation. Such locking means can be effectuated in various ways. For example, suitable devices include ball notches, tension springs, form- and force-locking safety mechanisms, and the like, which act either on one of the end faces or on the circumference of the control element.

If form-locking means are used which act on one of the end faces, it is advisable if the base ring is axially displaceable. To rotate the threaded nut, the base ring is pulled axially out of the lock, that is, in the direction of the forward end of the gun body and then, once released, can be turned into the desired position. However, when the base ring is in its rear position with its rear face contacting the gun body, the desired locking action is provided and it is not possible for the base ring and threaded nut to turn about the axis.

In another embodiment, the locking means can be provided as depressions and pins. The pins cooperate with the depressions and have the considerable advantage that they can be guided exactly into the receiving bores formed by the depressions, due to their longitudinal extension, with the result that they retain their effectiveness even when the welding gun is exposed to rough treatment.

Preferably, the depressions are arranged in the rear end face of the base ring, that is its face directed toward the gun body, while the pins are disposed in position corresponding to the depressions on the front side of the gun body facing the base ring and the pins extend forwardly from the gun body so that they can engage within the depressions.

Safety catches can be used advantageously for locking the operating control element in position. Suitable safety catches may be provided in various forms, for instance, bending springs, ball notches and the like.

In a preferred arrangement of the invention, the safety catches can be provided as radial springs cooperating with locking grooves. The radial springs can be arranged on the circumference of the base ring or to act on it. The advantage of radial springs is that they consist of a single part so that functional disturbances are substantially avoided.

In a preferred arrangement, the safety catches are arranged in the depressions or on the springs which interlock the gun body and the base ring. With such an arrangement the safety catches can be protected in a relatively easy manner against damage and fouling. It has been found to be particularly advantageous to arrange the radial grooves in the depressions formed in the base ring with the radial springs mounted on the pins which seat into the depressions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIG. 1 is a side view, partly in section, of a bolt welding gun in the rest position; and FIG. 2 is an enlarged detail view of the encircled section A in FIG. 1.

DETAILED DESCRIPTION OF THE INVENTION

In FIG. 1 a bolt welding gun is illustrated having a gun body 1 which has a front end facing in the direction in which elements are welded to a workpiece, however, the elements and workpiece are not shown in FIG. 1. A tubular front part 2 of an axially displaceable slide-in unit, not shown, is positioned in the front end of the gun body 1.

The tubular front part 2 has a female thread 2a. A bolt holder 3 extending coaxially with the tubular front part has a male thread 3a on its surface which is screwed into the female thread 2a. By turning the bolt holder 3 about its axis, its position can be varied with regard to the front part 2 so that an adjustable air gap is provided.

In addition, a rotatable operating control element 5 for a locking element 4 is located within the front end of the gun body 1. For securing the locking element against rotation, the control element 5 has a hexagonal recess 5a which corresponds in shape to the outside shape of the locking element and, as shown in FIG. 1, receives at least a part of the axial length of the locking element. Furthermore, supporting legs 6 for the welding gun are mounted in the control element and afford an excellent means for adjusting the control element. The supporting legs are secured within bores in the control element which extend in the axial direction of the bolt holder. However, the legs do not extend for the full distance of the bores, rather they stop at a position spaced axially from the rear end face of the control element. As a result, the portions of the bores which do not contain the legs form depressions 5b into which pins 7 extending forwardly from the gun body 1 can be seated. It is also possible to provide separate depressions and additional pins in both the control element 5 and the gun body 1, if necessary, to provide additional fine adjustment of the axial displacement of the control element.

To permit rotation of the locked operating control element 5, initially it is axially displaceable in the gun body, that is, by moving or pulling the element forwardly from the gun body, the pins 7 are disengaged from the depressions 5b so that the control element can be rotated about its axis.

However, it must be possible to prevent any automatic displacement of the control element 5 in the forward direction. To avoid such automatic or accidental displacement, radial grooves 5c are provided within the depressions 5b in the control element and radial springs 7a arranged on the pins 7, engage within the radial grooves.

In FIG. 2 the arrangement and function of the safety catches consisting of the radial grooves 5c and the radial springs 7a can be appreciated.

To permit the axial displacement of the control element 5 into a position in which it can rotate without interference from the locking action provided by the depressions 5b and the pins 7 and also not to influence the insertion of the slide-in unit in its rear position, the hexagonal recess 5a is worked for a considerable depth into the front side or face of the control element. By gripping the supporting legs 6 the control element can be slid forwardly over the locking element or nut 4 for releasing the locking engagement of the pins 7 within the depressions 5b. With the locking action released, the control element 5 can be rotated about its axis for removing the locking element 4 from engagement with the front end surface of the tubular front part 2. With the locking element released, the adjustment of the bolt holder 3 can be effected.

This construction of the bolt welding gun, in accordance with the present invention, permits a rapid exchange of the front parts without the use of tubes.

While a specific embodiment of the invention has been shown and described in detail to illustrate the application of the inventive principles, it will be understood that the invention may be embodied otherwise without departing from such principles.

What is claimed is:

1. Bolt welding gun comprising a gun body having a front end from which bolts and the like are welded to a workpiece, a slide-in unit mounted within the front end of said gun body, said slide-in unit includes an axially extending front tubular part located within the front end of said gun body, a tubular bolt holder disposed in threaded engagement with and extending forwardly from said front tubular part and extending forwardly of the front end of said gun body, and supporting legs extending forwardly from the front end of said gun body, wherein the improvement comprises a locking element in operative association with said tubular bolt holder for fixing the relative threaded engagement between said bolt holder and said front tubular part, said locking element being a threaded nut in threaded engagement with said bolt holder, and a rotatable control element having a common axis of rotation with said threaded nut being arranged to laterally enclose at least a portion of the axial extent of said locking element for preventing the rotation thereof.

2. Bolt welding gun, as set forth in claim 1, wherein said control element comprises a base ring axially displaceably positioned within the front end of said gun body, and supporting legs secured to and extending forwardly from said base ring.

3. Bolt welding gun, as set forth in claim 1, wherein locking means are disposed within said gun body and are arranged to engage said control element for releasably securing said control element against rotation.

4. Bolt welding gun, as set forth in claim 3, wherein said locking means comprises depressions formed in at least one of said control element and gun body and pins formed in at least the other one of said base ring and gun body so that the pins fit within the depressions for securing said base ring against rotation.

5. Bolt welding gun, as set forth in claim 4, wherein said base ring has a front end face facing in the direction in which elements are welded to a workpiece and a rear end face directed in the opposite direction, and said depressions being formed in said rear end face of said base ring and extending in the axial direction of said bolt holder.

6. Bolt welding gun, as set forth in claim 5, wherein said base ring has a plurality of bores extending in the axial direction of said bolt holder and said supporting legs disposed within said bores with the length of said supporting legs within said bores being less than the total axial length of said bores so that the remaining length free of said supporting legs forms said depressions of said locking means.

7. Bolt welding gun, as set forth in claim 4, wherein safety catches are provided for locking said control element in position when said pins are positioned within said depressions.

8. Bolt welding gun, as set forth in claim 7, wherein said safety catches comprise radial grooves and radial springs arranged to releasably seat within said radial grooves.

9. Bolt welding gun, as set forth in claim 8, wherein said radial grooves are located within the surfaces of said control element forming said depressions and said radial springs are mounted on said pins for engagement within said radial grooves.

10. Bolt welding gun, as set forth in claim 2, wherein said locking element has a multi-sided outside surface, and said control element has a multi-sided recess corresponding to the multi-sided outside surface of said locking element for receiving said locking element.

11. Bolt welding gun, as set forth in claim 10, wherein said locking element has a locking position on said bolt holder, and said recess in said control element has a base spaced from the forwardly facing end thereof which is spaced from said locking element in its locking position when said control element is secured against rotation so that said control element can be displaced out of locking engagement with said gun body for rotation about the axis of said tubular bolt holder for axially displacing said locking element from its locked position.

* * * * *